F. D. AMMEN.
ANIMAL TRAP AND TOY.
APPLICATION FILED APR. 6, 1917.
1,286,898.
Patented Dec. 10, 1918.
2 SHEETS—SHEET 2.
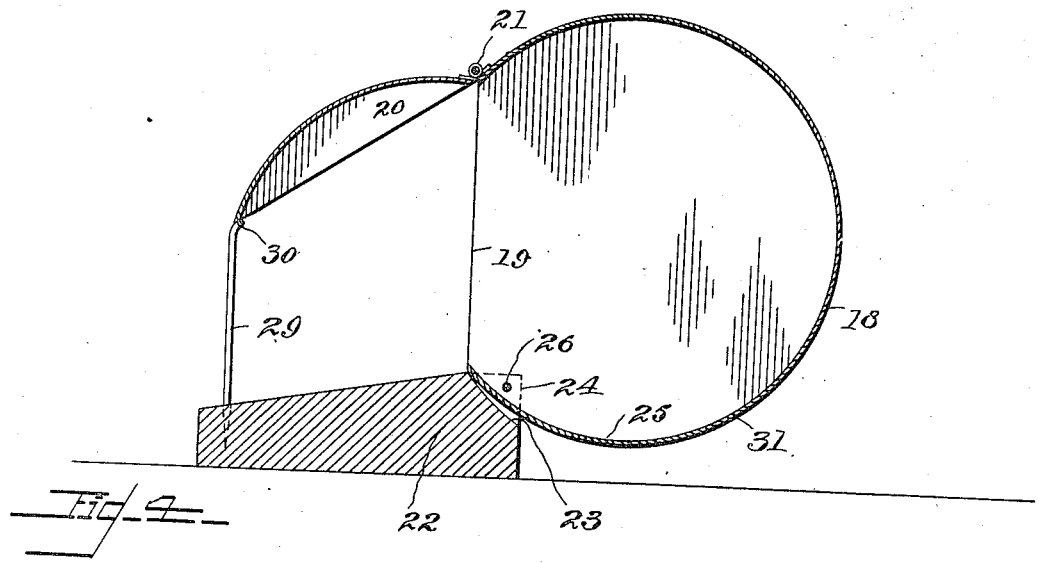
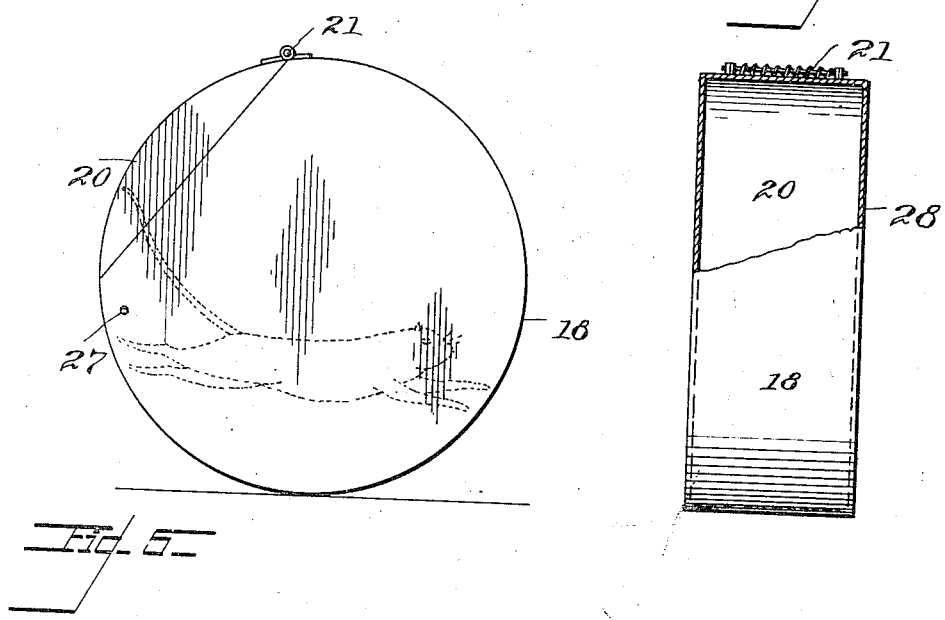
Inventor:
Francis D. Ammen
by
his Atty.

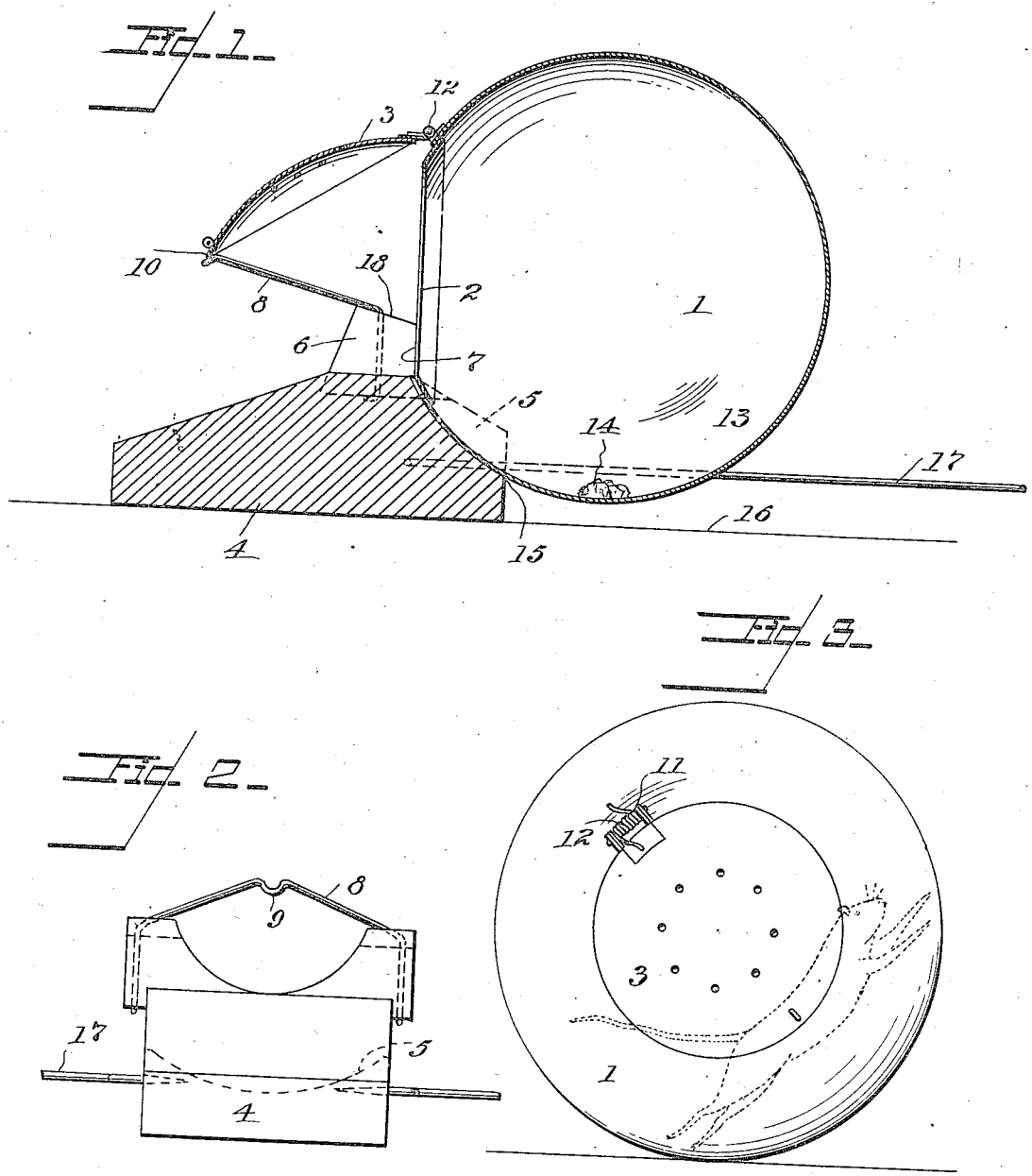

UNITED STATES PATENT OFFICE.

FRANCIS D. AMMEN, OF ST. LOUIS, MISSOURI.

ANIMAL-TRAP AND TOY.

1,286,898.

Specification of Letters Patent.   Patented Dec. 10, 1918.

Application filed April 6, 1917.   Serial No. 160,259.

*To all whom it may concern:*

Be it known that I, FRANCIS D. AMMEN, a citizen of the United States, residing in the city of St. Louis and State of Missouri, have invented new and useful Improvements in Animal-Traps and Toys, of which the following is a specification.

This invention relates to a device which is intended to serve the purpose of an animal trap and a toy. The general object of the invention is to provide very simple and inexpensive means for catching a small animal such as a mouse, alive. To this end, the device may include a cage having a special form adapting it to roll upon the floor. After the animal has been caught in this cage, the cage with the animal within it may then become a toy for the amusement of a child. One of my objects has been to produce a trap of such a simple form that it substantially comprises two members, namely, a cage and a device separable from the cage for holding the cage open until the animal is caught. In the embodiment of the invention described in the following specification, the weight of the animal within the cage operates to effect the closing of the cage. For this reason, it is desirable to make the cage very light in weight. In order to accomplish this and at the same time to increase the amusement and interest of children the cage is preferably constructed of a light transparent sheet material such as celluloid. This material is also very inexpensive, and in this regard it operates to reduce the expense of the trap and toy.

Further objects of the invention will appear hereinafter.

In the drawings which illustrate a preferred embodiment of my invention,

Figure 1 illustrates one form of my trap, the view being a vertical section through the trap showing it in its set condition.

Fig. 2 is a front elevation of the means which I may employ for holding the cage open in order to catch the animal within it, Fig. 3 is a side elevation of the cage of the form shown in Fig. 1 and indicating the manner in which the cage may be rolled about the floor by an animal confined within it, Fig. 4 is a view similar to Fig. 1 but showing another form the trap and toy may take, Fig. 5 is a side elevation showing the cage of Fig. 4 after the animal is caught, and indicating how it may roll upon the floor, and Fig. 6 is a substantially vertical section through the cage shown in Fig. 5.

Before proceeding to a detailed description of the parts of the trap and toy it may facilitate the disclosure of the invention to state that in the simple form in which it is described, the trap and toy comprises substantially two coöperating members, one of which is a cage-member capable of confining the animal and having a movable closure or lid. The other member is so constructed that it will coöperate with the cage-member to enable the animal to pass into the cage. The cage member and this other member to which I refer are separable from each other so that after the animal is caught, the cage with the animal confined within it may be used as a toy. To this end the cage is preferably formed with a curved wall enabling the animal to roll it across the floor.

In Figs. 1 to 3 the cage 1 is in the form of a hollow ball preferably made of celluloid or similar translucent or transparent material. The wall of this ball has an opening 2 with which coöperates a closure or lid 3. Coöperating with this cage-member 1, I provide another member 4 which coöperates with the cage to support the cage and to hold it in such a way as to permit an animal such as a mouse to enter the cage.

The device preferably operates in such a way that when the mouse is within the cage his weight causes a movement of the cage bodily, which movement operates automatically to close the opening of the cage. In order to accomplish this in a simple manner, the member 4 is preferably in the form of a block, or base, the rear side of which is cut away so as to form a socket 5 the face of which operates as a rest to engage the underside of the cage near the edge of the opening 2. The upper portion of this block presents upwardly extending abutments or side posts 6 which present substantially vertical faces 7 which engage the edge of the opening 2, when the ball is in place. The member 4 is further provided with means for holding the cage open. This is preferably in the form of detent means 8 which may consist of a bent wire forming a rudimentary frame, the outer end of said detent having a downwardly bent lip 9 which engages the inner side of the outer edge 10 of the lid. Any suitable means may be provided for effecting the closure of the lid. I prefer however to provide means tending to close the lid which means is resisted by the detent 8. For this purpose, I prefer to provide a hinge connection 11 for the lid, and this hinge connection includes a coil spring 12 so that the lid is constantly spring-pressed toward its closed position. With such a construction, it is evident that if the lid is open and the cage is applied to the supporting means or block 4 (see Fig. 1) the spring will operate to hold the cage in equilibrium, in the set condition of a trap, on the block with the lid open. When the cage is in this set condition, its rear part forms an overhanging portion 13 which extends rearwardly beyond the point of support of the cage on the supporting means or base 4. In this overhanging portion 13, I provide a quantity of bait 14.

Now when the mouse passes into the cage, his weight is exerted in the cage in the vicinity of the bait that is to say in the overhanging portion 13. There is nothing to resist this downward pressure of the animal's weight and consequently there is a tendency for the cage to tilt or rotate bodily about its point of support on the base 4. Referring to Fig. 1, the rotation would be toward the right, or clock-wise, about the edge 15. When this takes place, it is evident that the lip 9 will immediately become disengaged from the edge of the lid 3, whereupon the cage will automatically close, that is to say, the spring 12 will snap the lid shut. When this occurs, the ball will fall a short distance onto the floor which is indicated by the line 16. In order to prevent the ball from rolling about and becoming lost, I prefer to provide a small guard rail 17 which is attached to the block and which confines the ball after the mouse is caught.

With this embodiment of the invention, it is necessary to construct the detent means in such a way that no obstruction will be offered to the closing of the lid. For this purpose, I prefer to attach the bars which form the frame 8 on the upper faces 18 of the side posts 6, and furthermore the upper faces 18 and the frame 8 are preferably inclined in such a way that the frame and the faces 18 operate as a substantially straight guide, offering no obstruction to the edge of the lid.

As illustrated in Figs. 4 to 6, the cage is in the form of a cylinder 18, a portion of which is severed from the body of the cylinder on the line 19, and so as to form a closure or lid 20; a spring hinge connection 21 connects this lid with the body of the cage. The means to coöperate with this cage to enable it to catch the animal is preferably in the form of a block 22, the rear face of which has a socket 23 cut into it on its upperside so that it presents two projecting sides 24 between which a portion of the cylindrical wall 25 of the cage may rest at a point near the opening of the cage. The cage may be supported in this position by means of attaching means in the form of a detachable pin 26 which extends horizontally through openings in the sides 24 and through alining openings 27 in the side walls 28 of the cage. The means for holding the lid 20 open is in the form of detenting means 29 constructed as a bifurcated post extending up from the upper side of the block near the forward side thereof. The upper end of this detent-means is bent inwardly to form a lip 30 which engages under the outer edge of the lid opposite to the hinge 21.

With this form of the device, the rear part of the cage forms an overhanging portion 31 which projects beyond the point of support of the cage on the base. When the parts are placed in the relation shown in Fig. 4, the trap is in its set condition, that is to say, the cage is held open and is in a certain tilted position. When the animal passes into the overhanging portion of the cage his weight tilts the cage toward the right, and this movement is sufficient to disengage the outer edge of the lid from the detent 29, whereupon the spring hinge 21 closes the lid and confines the animal within the cage. The removable pin 26, of course, holds the cage on the block, but if desired, the pin 26 can be removed and the cage can be placed on the floor with the animal within it. The cage will then roll about the floor by reason of the movements of the animal within it thereby giving amusement to a child.

It is evident that in either form of the invention described above, the device operates in such a way that the cage is held in a position of equilibrium with the cage open, and a slight tilting movement from this position by the animal within the cage will automatically close the lid.

In both forms of the invention, it is necessary that the spring of the hinge shall have sufficient force to prevent the animal from opening the lid.

It is understood that the embodiment of the invention set forth herein is only one of the embodiments the invention may take, and I do not wish to be limited in the practice of my invention nor in my claims, to the particular embodiment set forth.

What I claim is:

1. In an animal trap, the combination with a cage having an opening, of means for supporting said cage in a set position to permit the entrance of the animal through said opening, said cage being constructed so as to be moved bodily from said set position by the weight of the animal after it enters the cage, and automatic means for closing said opening controlled by the said movement of the cage by the animal.

2. In an animal trap, the combination with a cage having an opening, of a base for supporting said cage in a set position above the floor to permit the entrance of the animal through said opening, said holder being constructed so as to be tilted bodily on said base by the weight of the animal after it enters the holder, and automatic means for closing said opening when said cage is tilted.

3. In an animal trap, the combination with a cage having an opening with a lid, of means tending to close said lid, means for holding said lid open and for supporting said cage in a position of equilibrium, said cage having an overhanging portion projecting beyond said supporting means, whereby the weight of the animal in said overhanging portion will tilt said cage and thereby permit said lid to close.

4. In an animal trap, the combination with a cage having an opening with a lid, of means tending to close said lid, means for supporting said cage, including detent means for engaging said lid to hold the same open, said cage having an overhanging portion projecting beyond said supporting means whereby the weight of the animal in said overhanging portion will tilt said cage to disengage the lid from the detent means and permit the lid to close.

5. In an animal trap, the combination with a cage having an opening with a spring-actuated lid, of a base for supporting said cage and having detent means for holding said lid open, said cage having an overhanging portion projecting beyond said base whereby the weight of the animal in said overhanging portion will tilt said cage on said base and disengage the lid from the detent means to permit said lid to close.

6. In an animal trap, the combination with a holder in the form of a cage having an opening in its wall with a spring-actuated lid, of means for supporting said cage and holding said lid in its open position to permit the entrance of the animal through said opening, said cage having an overhanging portion projecting from said supporting means whereby the weight of the animal in said overhanging portion will move said cage and permit said lid to close.

7. In an animal trap, the combination with a cage having a curved wall with an opening therethrough, of means for supporting said cage in a set position to permit the entrance of the animal through said opening, said cage having an overhanging portion projecting from said supporting means whereby the weight of the animal in said overhanging portion will move said cage on said supporting means, and automatic means for closing said opening when said cage has been moved.

8. In an animal trap, the combination with a cage in the form of a cylinder having an opening in its cylindrical wall, of a spring-actuated lid for said opening, and a base for engaging and supporting said cage adjacent said opening and carrying detent means for holding said lid open to permit the entrance of the animal, said cage having an overhanging portion projecting beyond the point of support of said base whereby the weight of the animal in said overhanging portion will move said cage and disengage said lid from said detent means to permit said lid to close.

9. In an animal trap, in combination, a cage in the form of a hollow body having a curved wall for confining the animal and having an opening in said wall, a lid for said opening, a spring tending to close said lid, and operating to prevent the animal from opening said lid when the animal is confined in said cage, and means for holding said lid open to permit the entrance of the animal.

10. An animal trap having a cage to confine the animal consisting of a hollow body with a curved wall having an opening therein, and a lid with a spring for said opening, said spring having sufficient force to prevent the animal from opening the lid.

11. In an animal trap and toy, the combination with a movably supported cage capable of confining an animal, and having a curved wall, said cage having an opening and a closure for said opening, of means for holding said closure open and coöperating with said cage to catch the animal within the cage, said cage being separable from said means to enable the cage to roll upon the floor while confining the animal.

12. In an animal trap the combination with a cage of cylindrical form having an opening in the curved wall thereof, of a spring-actuated lid for said opening, a base for detachably holding and supporting said cage and having detent means for holding said lid open, said cage having an overhanging portion projecting beyond said base whereby the weight of the animal in said cage will tilt said cage on said base and thereby disengage said lid from said detent means to permit the lid to close.

13. In an animal trap and toy, the combination of a cage having a curved wall, and having an opening, of a spring-actuated lid for said opening, a base, and attaching means for holding said cage on said base so that the cage may tilt on said base, said base having detent means for holding said lid open in one of the tilted positions of said cage, said cage having an overhanging portion to receive the animal whereby the weight of the animal in the cage will tilt said cage and thereby disengage the lid from said detent means and permit the lid to close, said attaching means being removable to permit the cage to roll upon the floor while confining the animal.

In testimony whereof, I have hereunto set my hand.

FRANCIS D. AMMEN.